United States Patent
Kim

(10) Patent No.: US 7,684,814 B2
(45) Date of Patent: Mar. 23, 2010

(54) SYSTEM, APPARATUS, AND METHOD FOR ENHANCING MOBILE COMMUNICATION TERMINAL PUSH TO TALK SERVICE

(75) Inventor: Woo-Seong Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1115 days.

(21) Appl. No.: 11/325,934

(22) Filed: Dec. 30, 2005

(65) Prior Publication Data

US 2006/0148504 A1 Jul. 6, 2006

(30) Foreign Application Priority Data

Dec. 30, 2004 (KR) .................. 10-2004-0117361

(51) Int. Cl.
*H04B 7/00* (2006.01)
*H04Q 7/20* (2006.01)
(52) U.S. Cl. ............ 455/517; 455/518; 455/412.2; 455/515
(58) Field of Classification Search ........... 455/518, 455/412.2, 517, 415, 416, 412.1, 446, 452.1, 455/466, 413, 414.1, 520, 515; 370/260
See application file for complete search history.

(56) References Cited

U.S. PATENT DOCUMENTS

| | | | |
|---|---|---|---|
| 6,763,226 B1 * | 7/2004 | McZeal, Jr. | 455/90.2 |
| 2006/0101116 A1 * | 5/2006 | Rittman et al. | 709/204 |
| 2006/0268750 A1 * | 11/2006 | Weiner | 370/260 |

FOREIGN PATENT DOCUMENTS

| | | |
|---|---|---|
| CN | 1138403 | 12/1996 |
| KR | 1020040016727 | 2/2004 |
| WO | WO 2004/100581 A1 | 11/2004 |

* cited by examiner

*Primary Examiner*—John Lee
(74) *Attorney, Agent, or Firm*—Lee, Hong, Degerman, Kang & Waimey

(57) ABSTRACT

Disclosed is a system, apparatus, and method for enhancing a mobile communication terminal PTT service which includes a Voice Message System (VMS) server for storing a voice message sent from a sender's terminal when a recipient's terminal is in a receive-not-ready state; and a Session Initiation Protocol (SIP) proxy server for transmitting the stored voice message to the recipient's terminal at the request of the recipient's terminal.

29 Claims, 4 Drawing Sheets

SYSTEM, APPARATUS, AND METHOD FOR ENHANCING MOBILE COMMUNICATION TERMINAL PUSH TO TALK SERVICE

CROSS-REFERENCE TO RELATED APPLICATIONS

Pursuant to 35 U.S.C. §119(a), this application claims the benefit of the Korean Patent Application No. 117361/2004, filed on Dec. 30, 2004, which is hereby incorporated by reference as if fully set forth herein.

FIELD OF THE INVENTION

The present invention relates to a mobile communication terminal (hereinafter, "terminal"), and more particularly, to a system, apparatus, and method for enhancing a Push-To-Talk (PTT) service, thereby improving user convenience.

BACKGROUND OF THE INVENTION

With the advancement of mobile communication terminal functions, the terminals are more than simple wireless communication devices and may include functions such as a camera function and a multimedia reproduction function in addition to a wireless communication function. Such camera and multimedia reproduction functions are advanced functions that have been gradually popularized because of display unit enhancements and high-speed communication. A terminal having a high-resolution camera and a liquid crystal display (LCD) screen is already in general use.

In addition, a terminal providing a PTT service has been developed. Like a walkie-talkie service, the PTT service is a half-duplex communication method, wherein only one party may use the communication channel at a given time, and provides One-to-One or One-to-Many communication service.

Full-duplex communication allows two-way voice communication without any distinction between a speaker and a listener. However, in half-duplex communication such as the PTT service, an obvious distinction exists between a speaker and a listener, and only one user can be a speaker at a given time. A system supporting a terminal PTT service in accordance with the related art is shown and described with in FIG. 1.

FIG. 1 shows how signals flow in a terminal supporting PTT service in accordance with the related art, wherein the system supporting a PTT service includes: a sender's terminal 10 for sending voice data by using a PTT key mounted on the terminal; a Session Initiation Protocol (SIP) Proxy server 20 for transmitting the sent voice data; and a recipient's terminal 30 for receiving the transmitted voice data.

The operation of the terminal supporting a PTT service in accordance with the related art having such construction will be described as follows. A PTT key is mounted on the terminal in order to request the floor, and the user requests the floor by pressing the mounted PTT key. In other words, said sender's terminal 10 sends an INVITE message that the user requests the floor to the SIP proxy server 20.

The SIP proxy server 20 receives the INVITE message, checks a position of the corresponding recipient's terminal 30 on the basis of the received INVITE message, and sets up a session between the recipient's terminal 30 and the sender's terminal 10 using SIP. If the SIP proxy server 20 cannot set up a session between the recipient's terminal 30 and the sender's terminal 10, for example, when the recipient's terminal 30 is in a shadow area or a reception rejection state, the SIP proxy server sends an error message to the sender's terminal 10. The sender's terminal 10 then cannot send a voice message to the recipient's terminal 30.

If a session between the recipient's terminal 30 and the sender's terminal 10 is established, the sender's terminal 10 sends the voice message to the SIP proxy server 20, the SIP proxy server 20 sends the sent voice message using Real Time Protocol (RTP) to the session-established recipient's terminal 30.

However, since the terminal supporting a PTT service in accordance with the related art sends a voice message only to the session-established recipient's terminal, there is a problem that the system cannot transmit the voice message to the recipient's terminal having no session established with the sender's terminal.

SUMMARY OF THE INVENTION

Therefore, an object of the present invention is to provide a system, apparatus, and method for enhancing a service PTT service that can improve user convenience by storing a voice message when a recipient's terminal in a receive-not-ready state, and by transmitting the stored voice message at the recipient's request.

To achieve this and other advantages and in accordance with the purpose of the present invention, as embodied and broadly described herein, a system for enhancing a mobile communication terminal PTT service is provided, wherein the system comprises: a sender's terminal, a recipient's terminal, a Voice Message System (VMS) server for storing a voice message sent from the sender's terminal when the recipient's terminal is in a receive-not-ready state; and a SIP proxy server for transmitting the stored voice message to the recipient's terminal at the recipient's request.

To achieve these and other advantages and in accordance with the purpose of the present invention, as embodied and broadly described herein, a method is provided for enhancing a mobile communication terminal PTT service, the method comprising: storing a voice message sent from a sender's terminal when the recipient's is in a receive-not-ready state; and transmitting the stored voice message to the recipient's terminal at the recipient's request.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The invention will be described in detail with reference to the following drawings in which like reference numerals refer to like elements, wherein.

DETAILED DESCRIPTION OF THE EMBODIMENTS

Reference will now be made in detail to the preferred embodiments of the present invention, examples of which are illustrated in the accompanying drawings.

One embodiment of a system, apparatus, and method for enhancing a mobile communication terminal PTT service in accordance with the present invention will be described in detail with reference to the accompanying drawings. The present invention improves user convenience by storing a voice message when a recipient's terminal is in a receive-not-ready state, and by transmitting the stored voice message at the recipient's request.

Figure 4:
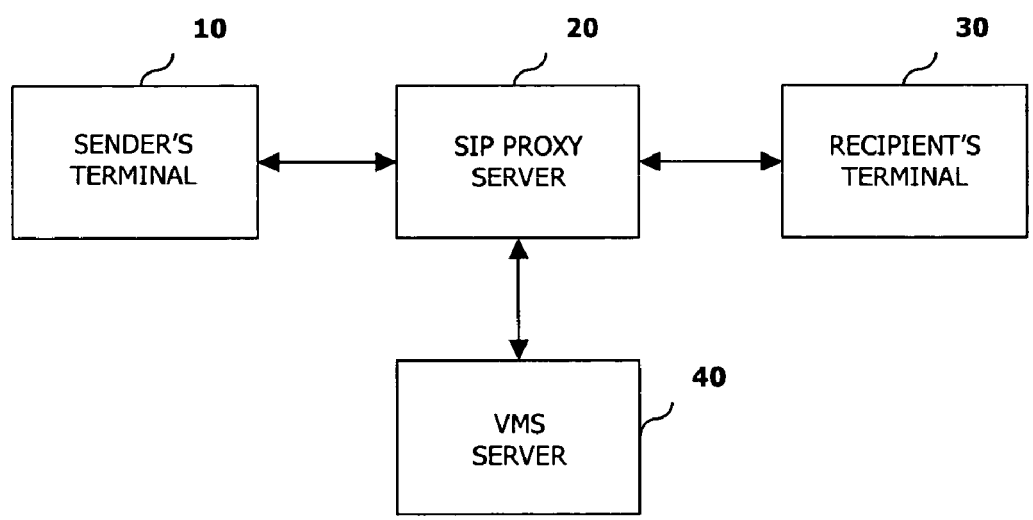
FIG. 4 is a block diagram for the inventive mobile communication terminal PTT service apparatus.

FIG. 4 shows a block diagram for one embodiment of the mobile communication terminal PTT apparatus in which a sender's mobile communication terminal 10 and a recipient's mobile communication terminal 30 are coupled with a SIP proxy server 20 for communicating voice messages in a PTT service. The SIP proxy server is further coupled with a VMS server 40 for storing voice messages when the recipient's terminal is in a state that it cannot receive voice messages.

Figure 1:
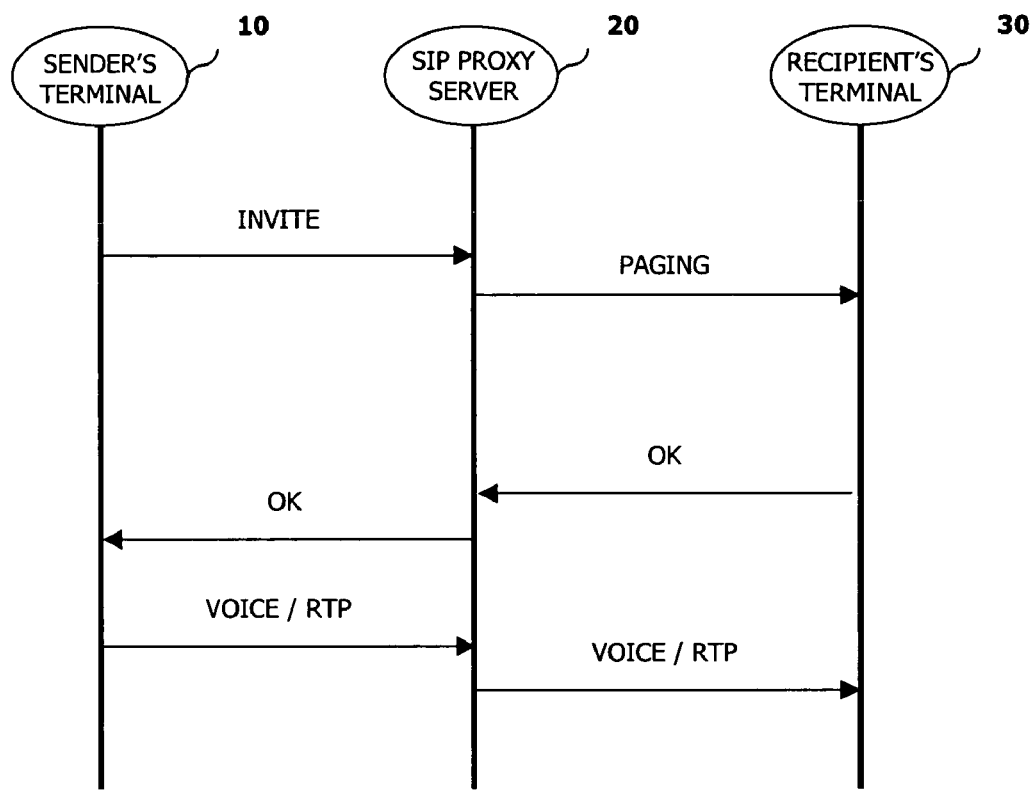
FIG. 1 is shows the operation of a system supporting a mobile communication terminal PTT service in accordance with the related art.
Figure 2:
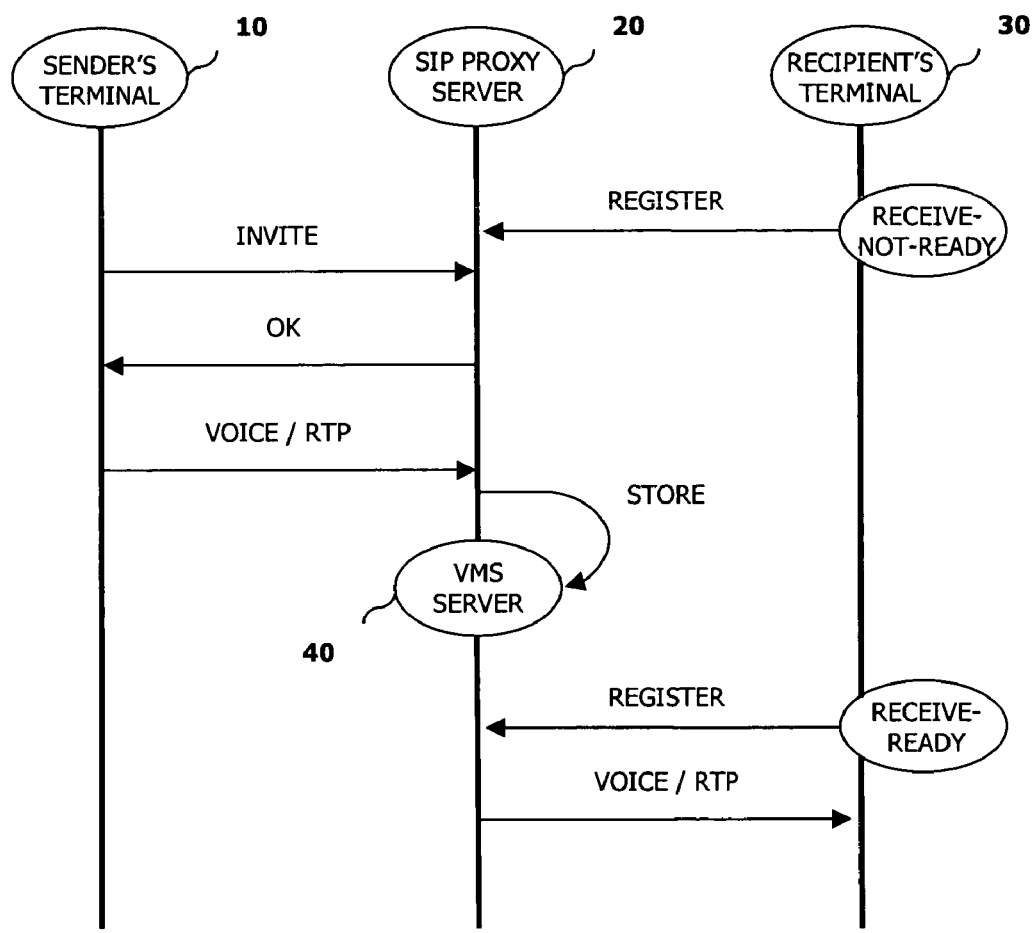
FIG. 2 shows the operation of a system for enhancing a mobile communication terminal PTT service in accordance with the present invention.

FIG. 2 shows the operation of a system for enhancing a mobile communication terminal PTT service in accordance with the present invention, wherein the system includes: a sender's terminal 10 for sending a voice message by pressing a PTT key mounted on the terminal; a SIP Proxy Server 20 for transmitting the voice message having been sent from the sender's terminal 10; a VMS (Voice Message System) server 40 for storing the voice message transmitted from the SIP proxy server 20; and a recipient's terminal 30 requesting and receiving the voice message stored in the VMS server 40.

Figure 3:
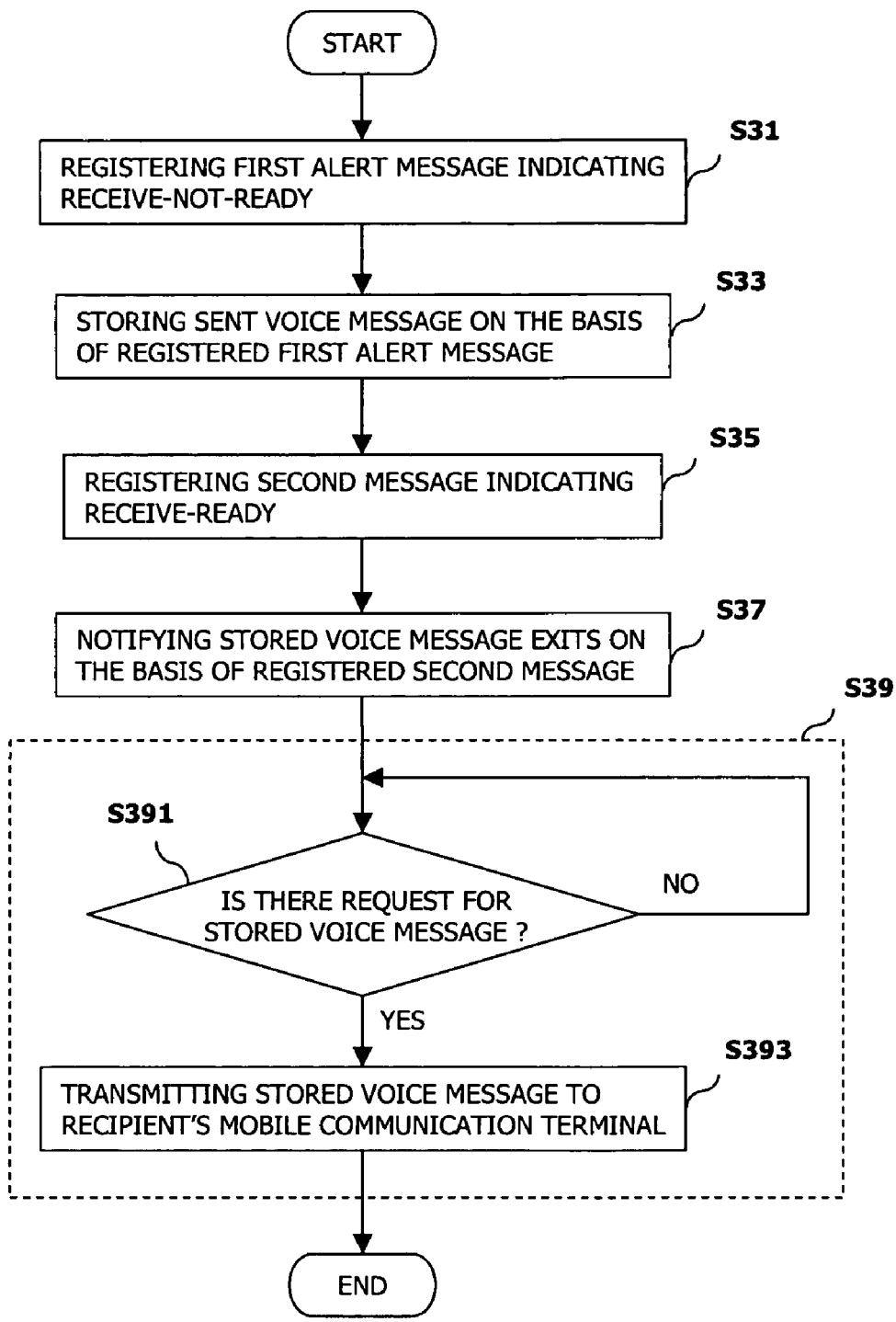
FIG. 3 is a flowchart showing a method for enhancing a mobile communication terminal PTT service in accordance with the present invention.

The method for enhancing a mobile communication terminal PTT service in accordance with the present invention having such construction will be described with reference to the flowchart shown in FIG. 3, wherein the method comprises: registering a first alert message indicating a receive-not-ready state of recipient's (S31); storing a voice message received from the sender's terminal when the registered first alert message exists (S33); registering a second alert message indicating a receive-ready state of the recipient's terminal (S35); notifying the recipient's terminal that the stored voice message exists when the registered second alert message exists (S37); and transmitting the stored voice message to the recipient's terminal at the request of the recipient's terminal (S39).

The method for enhancing a mobile communication terminal PTT service in accordance with the present invention will be described in detail with reference to FIGS. 2 and 3.

Initially, a recipient's terminal 30 registers a first alert message indicating a receive-not-ready state in the SIP proxy server 20 (S31) The recipient's terminal 30 can automatically generate the first alert message when approaching a shadow area and register the generated first alert message in the SIP proxy server 20, or the user may set the recipient's terminal 30 to a reception rejection state thereby generating the first alert message to the SIP proxy server 20.

The sender requests the floor by pressing the PTT key mounted on the sender's terminal 10 causing the sender's terminal 10 to send an INVITE message to the SIP proxy server 20.

The SIP proxy server 20 receives the INVITE message, and checks the first alert message indicating the receive-not-ready state of the corresponding recipient's terminal 30. Even though the recipient's terminal 30 is in the receive-not-ready state, the SIP proxy server 20 sets up a session between the recipient's terminal 30 and the sender's terminal 10 through session initiation protocol. Thus, the sender's terminal 10 can send a voice message to the SIP proxy sever 20.

When the recipient's terminal 30 is in a receive-ready state, the SIP proxy server 20 sets up a session between the recipient's terminal 30 and the sender's terminal 10. Thus, the voice message having been sent from the sender's terminal 10 is received at the recipient's terminal 30 through the established session. Since this is identical to a description for the operational principle of the system supporting a mobile communication terminal PTT service accordance with the related art, a detailed description therefore will be omitted.

Hereupon, as the sender's terminal 10 sends a voice message to the session-established SIP proxy server 20, the SIP proxy server 20 transmits the sent voice message to the VMS server 40, and the VMS server 40 stores the transmitted voice message for a predetermined time (S33). Here, the predetermined time means a time taken until a delete command is received from the recipient's terminal 30 from a point of time that the transmitted voice message is stored in the VMS server 40.

Thereafter, when the recipient's terminal 30 can receive the voice message having been sent from the sender's terminal 10, the recipient's terminal 30 registers a second alert message indicating a receive-ready state in the SIP proxy server 20 (S35). That is, the recipient's terminal 30 can automatically generate the second alert message when leaving the shadow area, or the recipient's terminal 30 can generate the second alert message when the user may sets the receive-ready state, and register the generated second alert message in the SIP proxy server 20.

When receiving the second alert message indicating the receive-ready state from the recipient's terminal 30, the SIP proxy server 20 transmits a message notifying the recipient's terminal 30 that the stored voice message exists (S37).

The SIP proxy sever 20 transmits the stored voice message to the recipient's terminal 30 at the request of the recipient's terminal 30 (S39). That is, as the recipient's terminal 30 requests the stored voice message from the SIP proxy server 20 (S391), the SIP proxy server 20 can transmit the voice message stored in the VMS server 40 through Real Time Protocol (RTP) to the recipient's terminal 30 (S393).

Accordingly, being in a receive-not-ready state, the SIP proxy server 20 stores the voice message sent from the sender's terminal 10 in the VMS server 40. Thus, the recipient's terminal 30 can receive the stored voice message in a receive-ready state.

As so far described, a system, apparatus, and method for enhancing a mobile communication terminal PTT service in accordance with the present invention can improve user convenience by storing a voice message when a recipient's terminal is in a receive-not-ready state, and transmitting the voice message to the recipient at the recipient's request.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

I claim:

1. A system for enhancing a mobile communication terminal PTT service, the system comprising:
   a sender's mobile communication terminal for transmitting a voice message;
   a recipient's mobile communication terminal for generating and transmitting a first alert message indicating a first state and a second alert message indicating a second state;
   a Voice Message System (VMS) server for storing the voice message sent from the sender's terminal; and
   a Session Initiation Protocol (SIP) proxy server for storing the voice message on the VMS server when the recipient's terminal is in the first state and for transmitting the stored voice message to the recipient's terminal when the SIP proxy server receives a request message from the recipient's terminal and when the recipient's terminal is in the second state.

2. The system of claim 1, wherein the first state indicates the recipient's terminal cannot receive the voice message.

3. The system of claim 1, wherein the second state indicates the recipient's terminal is able to receive the voice message.

4. The system of claim 1, wherein the recipient's terminal generates the first alert message indicating the recipient's terminal enters the first state and transmits the first alert message to the SIP proxy server.

5. The system of claim 1, wherein the SIP proxy server sends the voice message to the VMS server responsive to the first alert message.

6. The system of claim 1, wherein the recipient's terminal generates the second alert message indicating the recipient's terminal enters the second state and transmits the second alert message to the SIP proxy server.

7. The system of claim 6, wherein the recipient initiates the second alert message.

8. The system of claim 1, wherein, responsive to the second alert message, the SIP proxy server notifies the recipient's terminal that the voice message is stored in the VMS.

9. The system of claim 1, wherein the recipient's terminal transmits a request for the stored voice message.

10. The system of claim 9, wherein the recipient's terminal transmits the request for the stored voice message concurrently with transmitting the second alert message.

11. The system of claim 1, wherein the SIP server retrieves the stored voice message from the VMS server and transmits the stored voice message to the recipient's terminal.

12. A method for enhancing a mobile communication terminal PTT service, the method comprising the steps of:
   registering whether a recipient's mobile communication terminal is in a first state or a second state;
   storing a voice message sent from a sender's mobile communication terminal when the recipient's mobile communication terminal is in the first state; and
   transmitting the stored voice message to the recipient's terminal at the request of the recipient's terminal when the recipient's terminal is in the second state.

13. The method of claim 12, wherein the storing step comprises:
   generating a first alert message indicating the recipient's terminal is in the first state;
   transmitting the first message to a SIP proxy server and storing the voice message sent from the sender's terminal in a VMS server responsive to the first message.

14. The method of claim 13, further comprising:
   generating a second alert message indicating the recipient's terminal is in a second state;
   transmitting the second alert message to the SIP proxy server;
   notifying the recipient's terminal that a voice message is stored responsive to the second alert message; and
   transmitting the stored voice message to the recipient's terminal at the request of the recipient's terminal.

15. The method of claim 14, wherein the recipient's terminal transmits the request for the stored voice message concurrently with transmitting the second alert message.

16. The method of claim 14, wherein the second alert message is generated when the recipient's terminal enters an area where reception of the voice message is not possible.

17. The method of claim 14, wherein the recipient initiates generating the second alert message.

18. An apparatus for enhancing a mobile communication terminal PTT service, the apparatus comprising:
   a Session Initiation Protocol (SIP) proxy server for receiving a voice message from a sender's mobile communication terminal and for transmitting a stored voice message to a recipient's mobile communication terminal when requested by the recipient's terminal; and
   a Voice Message System (VMS) server coupled with the SIP proxy server for storing the voice message sent from the sender's terminal responsive to whether the recipient's terminal is in a first or a second state,
   wherein the SIP proxy server stores the voice message on the VMS server when the recipient's terminal is in the first state and transmits the voice message to the recipient's terminal when the recipient's terminal is in the second state,
   wherein the recipient's terminal generates and transmits a first alert message to the SIP proxy server to indicate the recipient's terminal transitions to the first state, and
   wherein the recipient's terminal generates and transmits a second alert message to the SIP proxy server to indicate the recipient's terminal transitions to the second state.

19. The apparatus of claim 18, wherein the recipient's terminal generates the first alert message when the recipient's terminal is located in an area where reception is not possible.

20. The apparatus of claim 18, wherein the recipient initiates the generation of the first alert message.

21. The apparatus of claim 18, wherein the recipient's terminal generates the second alert message when the recipient's terminal is located in an area where reception is possible.

22. The apparatus of claim 18, wherein the recipient initiates the generation of the second alert message.

23. The apparatus of claim 18, wherein the SIP proxy server generates a notification message and transmits the notification message to the recipient's terminal when the SIP proxy server receives the second alert message and when the SIP proxy server has stored the voice message.

24. The apparatus of claim 23, wherein the recipient's terminal generates a request message upon receiving the notification message and transmits the request message to the SIP proxy server.

25. The apparatus of claim 24, wherein the SIP proxy server, upon receiving the request message, retrieves the stored voice message from the VMS server, and transmits the stored voice message to the recipient's terminal.

26. A method for enhancing a mobile communication terminal PTT service, the method comprising:
   transmitting a first alert message from a recipient's mobile communication terminal to a Session Initiation Protocol (SIP) proxy server when entering a first state, wherein the SIP proxy server stores a voice message sent from a sender's mobile communication terminal in response to the first alert message;

transmitting a second alert message from the recipient's mobile communication terminal to the SIP proxy server when transitioning to a second state;

receiving at the recipient's mobile communication terminal notification from the SIP proxy server that the voice message is stored, the notification being received in response to the second alert message;

requesting transmission of the stored voice message via the recipient's mobile communication terminal; and receiving the stored voice message from the SIP proxy server at the recipient's mobile communication terminal in response to the request.

27. The method of claim 26, further comprising generating the first alert message when the recipient's mobile communication terminal is located in an area where reception is not possible.

28. The method of claim 26, further comprising generating the second alert message when the recipient's mobile communication terminal is located in an area where reception is possible.

29. The method of claim 26, further comprising:
generating a notification message via the SIP proxy server when the SIP proxy server receives the second alert message and when the SIP proxy server has stored the voice message; and transmitting the notification message via the SIP proxy server to the recipient's terminal.

* * * * *